United States Patent
McMahan et al.

(10) Patent No.: US 9,087,034 B2
(45) Date of Patent: Jul. 21, 2015

(54) FORM MULTIPLEXER FOR A PORTAL ENVIRONMENT

(75) Inventors: Paul F. McMahan, Apex, NC (US); Christopher J. Schaubach, Cary, NC (US); Robert T. Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 2942 days.

(21) Appl. No.: 11/307,838

(22) Filed: Feb. 24, 2006

(65) Prior Publication Data
US 2007/0204213 A1    Aug. 30, 2007

(51) Int. Cl.
G06F 17/30    (2006.01)
G06F 17/24    (2006.01)

(52) U.S. Cl.
CPC .................................. *G06F 17/243* (2013.01)

(58) Field of Classification Search
CPC ............................................... G06F 17/30864
USPC ........... 713/168; 709/217; 715/221, 222, 223, 715/234; 707/3
See application file for complete search history.

(56) References Cited

U.S. PATENT DOCUMENTS

| | | | |
|---|---|---|---|
| 6,912,532 B2 | 6/2005 | Andersen | |
| 7,131,001 B1* | 10/2006 | Johnson | 713/168 |
| 7,149,960 B1* | 12/2006 | Brooks et al. | 715/234 |
| 7,191,391 B2* | 3/2007 | Takashima | 715/236 |
| 7,565,621 B2* | 7/2009 | Molander et al. | 715/805 |
| 2002/0067376 A1 | 6/2002 | Martin et al. | |
| 2003/0191799 A1 | 10/2003 | Araujo et al. | |
| 2004/0031058 A1 | 2/2004 | Reisman | |
| 2004/0073941 A1 | 4/2004 | Ludvig et al. | |
| 2004/0107404 A1* | 6/2004 | Burns et al. | 715/526 |
| 2004/0243928 A1* | 12/2004 | Hesmer et al. | 715/505 |
| 2005/0027887 A1 | 2/2005 | Zimler et al. | |
| 2005/0038869 A1 | 2/2005 | Zimler et al. | |
| 2005/0050021 A1* | 3/2005 | Timmons | 707/3 |
| 2005/0055262 A1* | 3/2005 | Florczak | 705/9 |
| 2006/0015839 A1* | 1/2006 | Owens et al. | 717/100 |
| 2006/0036756 A1* | 2/2006 | Driemeyer et al. | 709/231 |
| 2006/0225091 A1* | 10/2006 | Facemire et al. | 725/35 |
| 2006/0235690 A1* | 10/2006 | Tomasic et al. | 704/257 |
| 2007/0156871 A1* | 7/2007 | Braun et al. | 709/223 |

FOREIGN PATENT DOCUMENTS

EP    1545059    6/2005
WO    03096669 A2    11/2003

OTHER PUBLICATIONS

"Hands on Portlets; Writing a Portlet"—Grid Sphere Team, Albert Einstein Institute, May 2004 http://www.dma.unina.it/murli/GridSummerSchool2004/presentations/gridsphere/pdf/GridSphereTutorial.pdf.*

* cited by examiner

*Primary Examiner* — Randy Scott
(74) *Attorney, Agent, or Firm* — Charles L. Moore; Moore & Van Allen PLLC

(57) ABSTRACT

A method to manage inputs from multiple portlets of a portal page may include gathering any inputs from forms associated with portlets other than a form associated with a portlet that is being submitted. The method may also include appending each gathered input to the form being submitted with an identifier of the form to which the gathered input belongs.

14 Claims, 6 Drawing Sheets

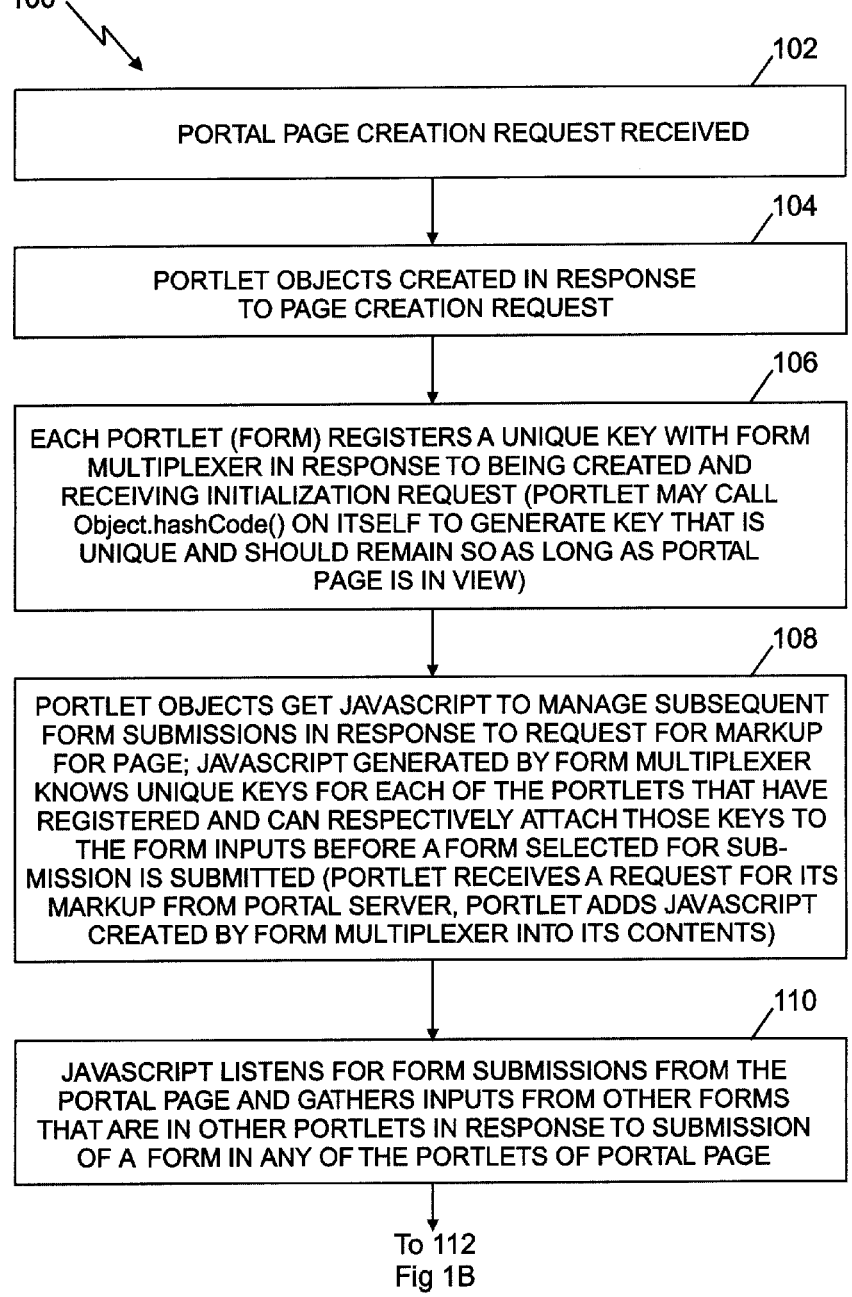

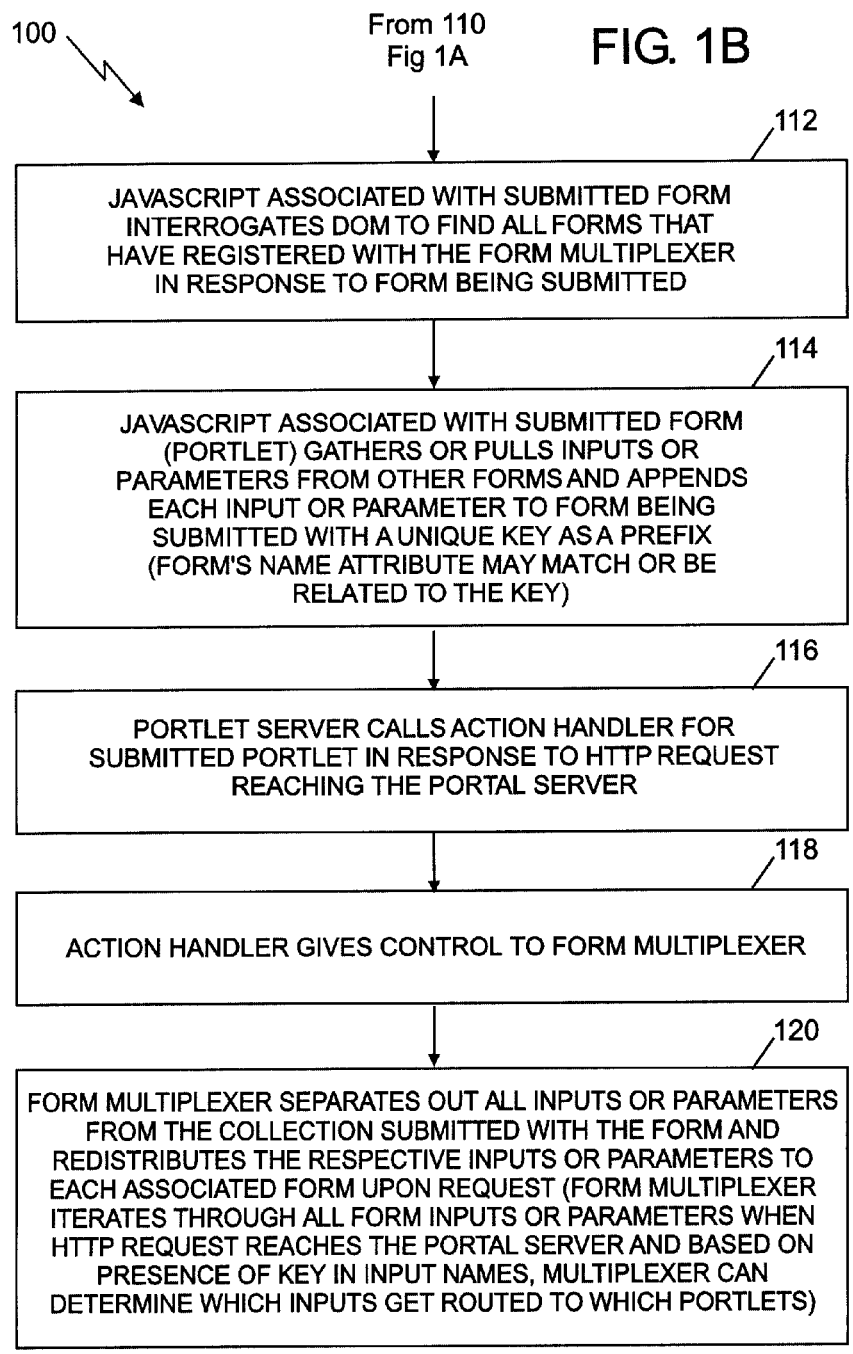

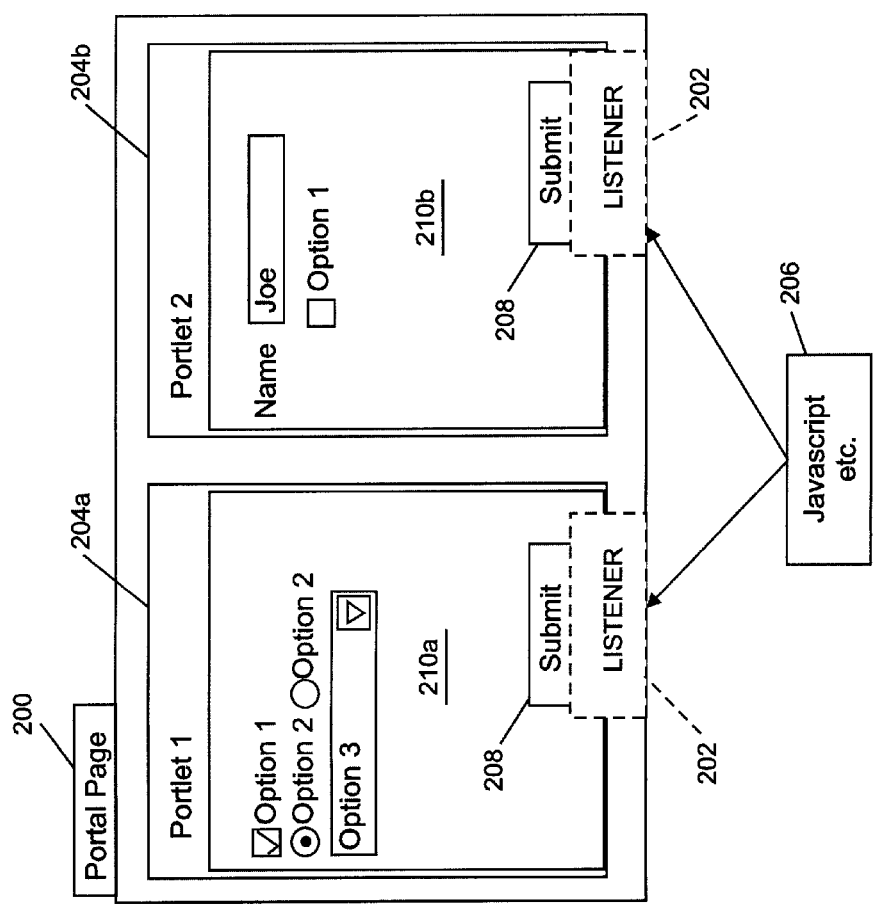

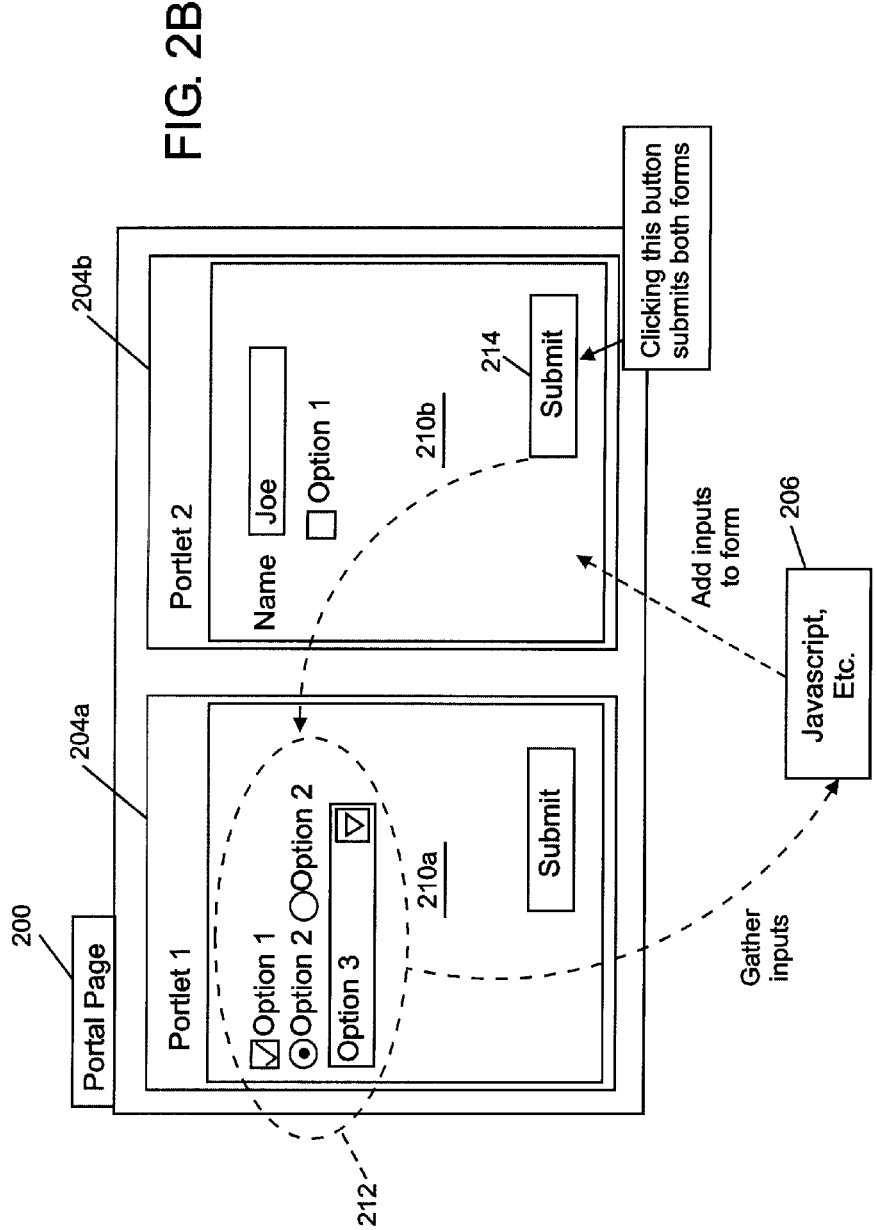

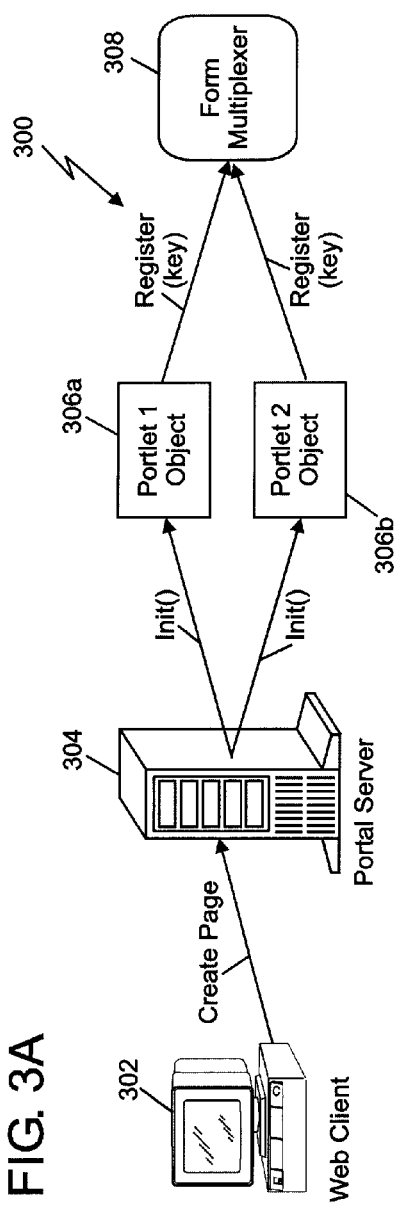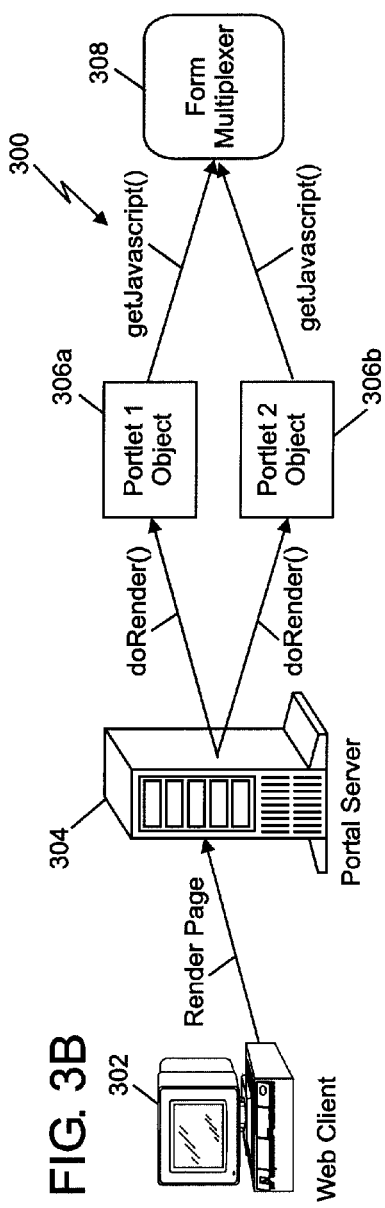

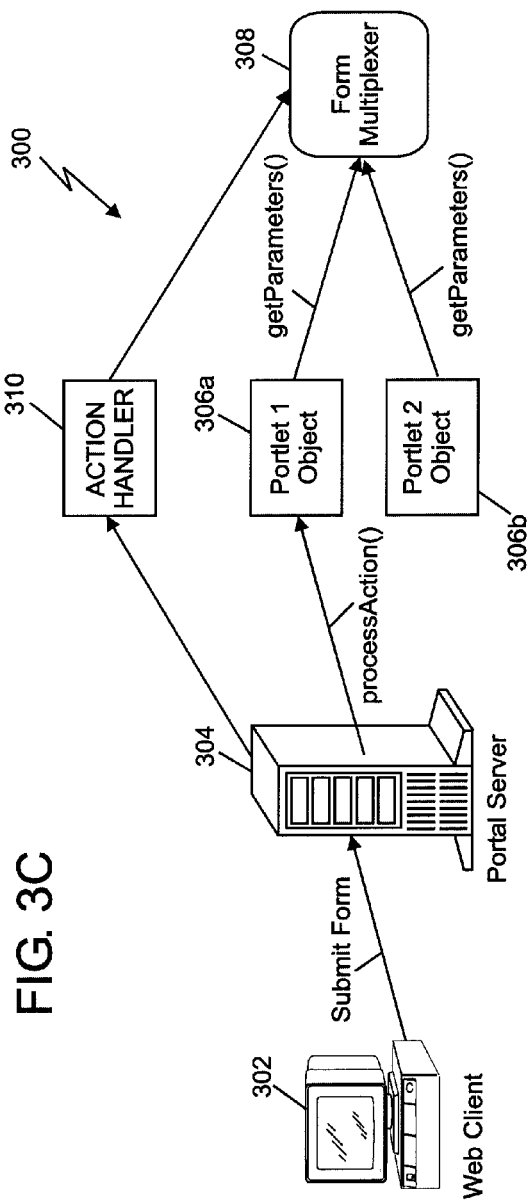

US 9,087,034 B2

FORM MULTIPLEXER FOR A PORTAL ENVIRONMENT

BACKGROUND OF THE INVENTION

The present invention relates to portal environments or the like, and more particularly to a form multiplexer for a portal environment and method and system for handling or managing submission of inputs from multiple portlets of a portal page.

In a portal web page each portlet constitutes an independent portion of the overall portal page. The markup that constitutes a form in one portlet is isolated from the markup in the other portlets. Accordingly, if multiple portlets that are on the same portal page each contain a form, each form must be completed and submitted separately. Otherwise the user would lose the data that was entered into all other portlets or forms but the one portlet or form that is submitted by operation of a submission button or other means on the submitted portlet. There currently is no system or method to allow portal users to interact with multiple forms spread across multiple portlets on the same portal page at the same time without having to submit each form separately.

BRIEF SUMMARY OF THE INVENTION

In accordance with an embodiment of the present invention, a method to manage inputs from multiple portlets of a portal page may include gathering any inputs from forms associated with portlets other than a form associated with a portlet that is being submitted. The method may also include appending each gathered input to the form being submitted with a unique key or identifier of the form to which the gathered input belongs.

In accordance with another embodiment of the present invention, a system to manage inputs from multiple portlets of a portal environment may include a form multiplexer. The system may also include a JavaScript or similar code generable by the form multiplexer for managing any form submissions.

In accordance with another embodiment of the present invention, a computer program product to manage inputs from multiple portlets of a portal page may include a computer usable medium having computer usable program code embodied therein. The computer usable medium may include computer usable program code configured to gather any inputs from forms associated with portlets other than a form associated with a portlet that is being submitted. The computer usable medium may also include computer usable program code configured to append each gathered input to the form being submitted with a unique key or identifier of the form to which the gathered input belongs.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIGS. 1A and 1B (collectively FIG. 1) are a flow chart of an example of a method to manage inputs from multiple portlets of a portal page in accordance with an embodiment of the present invention.

FIG. 2A is an illustration of an example of attaching listeners to portlets in accordance with an embodiment of the present invention.

FIG. 2B is an illustration of an example of gathering inputs from other portlets for submission with a portlet form that has be selected for submission in accordance with an embodiment of the present invention.

FIGS. 3A, 3B and 3C each illustrate an exemplary system and sequence of operations to submit inputs from multiple portlets of a portal page in accordance with an embodiment of the present invention.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIGS. 1A and 1B (collectively FIG. 1) are a flow chart of an example of a method 100 to manage inputs from multiple portlets of a portal page in accordance with an embodiment of the present invention. In block 102, a request for creation of a portal page may be received by a portal server from a web client or user. In block 104, portlet objects may be created in response to the page creation request. In block 106, each portlet or form may register a unique identifier or unique key with a form multiplexer in response to the portlet being created and receiving an initialization request. The form multiplexer may be a java object or portal service which may implement a certain interface and may be made available to all portlets within the portal environment. Each portlet may call a portal service or an "Object.hashCode( )" on itself to generate a key that is unique to the portlet. The unique key will be associated with the portlet or form so as long as the portal page is in view or being accessed by the user or web client. A name attribute of the portlet or form may match or be related to the key or identifier.

In block 108, each portlet object may get a JavaScript or the like to manage or handle subsequent form submissions in response to a request for the markup for the portal page from the portal server. The JavaScript generated by the form multiplexer knows the unique keys for each of the portlets or forms that have registered and can attach or otherwise associate those keys to the respective inputs belonging to each of the respective portlets or forms before a form that has been selected for submission is submitted. When a portlet receives a request for its markup from a portal server, the portlet adds JavaScript created and provided by the form multiplexer to its contents. While the present invention is described with respect to the use of JavaScript, any code, scripting language or the like capable of performing functions similar to those described herein may be used.

In block 110, the JavaScript may be adapted to listen for a form submission from the portal page. Listeners or the like may be attached to each of the portlets or forms to listen or detect submission of a form associated with one of the portlets of a portal page.

Referring also to FIG. 2A, FIG. 2A is an illustration of a portal page 200 and an example of attaching respective listeners 202 to portlets 204 of the portal page 200 in accordance with an embodiment of the present invention. A listener 202 may be attached to each of the respective portlets 204 by the JavaScript 206 to listen for submission of the associated portlet 204 or to detect operation of the associated "Submit" button 206 or other submission means by a user to submit a form 210 associated with the portlet 204. FIG. 2A is a conceptual client side view of the method to manage submission of inputs from multiple portlets of a portal environment.

Referring back to block 110 in FIG. 1, the JavaScript may gather or cause to be gathered inputs from other forms that are in other portlets of the portal page which have not been selected for submission in response to another form of the portal page being selected for submission.

In block 112, the JavaScript associated with the submitted form or form selected to be submitted may interrogate a Document Object Model (DOM) to find all forms of the portal page that have registered with the form multiplexer in response to the form being submitted or selected for submission.

In block 114, the JavaScript associated with the submitted form or portlet or form to be submitted may gather or pull inputs from other forms and may append each input to the form being submitted. Each input may be appended with the unique identifier or key as a prefix. The inputs may be parameters, data or other information that may have been entered into the respective forms or portlets by the user and that were not selected for submission.

Referring also to FIG. 2B, FIG. 2B is an illustration of the portal page 200 and of an example of gathering inputs 212 from other portlets 204a for submission with a portlet or form 204b that has be selected for submission in accordance with an embodiment of the present invention. The JavaScript 206 may gather inputs 212 from other forms 210a or portlets 204a and add or append the inputs 212 to the form 210b or portlet 204b selected for submission. The form 210b or portlet 204b may be selected for submission by a user operating or clicking-on a "Submit" button 214 or similar means.

Referring back to FIG. 1, in block 116, the portlet server may call an action handler for the submitted portlet in response a HyperText Transfer Protocol (HTTP) request reaching the portal server. In block 118, the action handler may relinquish control to the form multiplexer for redistribution of the inputs. Action handlers are known in the art.

In block 120, the form multiplexer may separate out all of the appended inputs submitted with the selected form using the unique keys. The form multiplexer may redistribute the respective inputs to each of the associated forms. In this regard, the form multiplexer may iterate through all of the form inputs when the HTTP request reaches the portal server and based on the presence of the unique key, the multiplexer can determine which inputs get routed to which portlets or forms.

FIGS. 3A, 3B and 3C each illustrate an exemplary system 300 and sequence of operations to submit inputs from multiple portlets of a portal page in accordance with an embodiment of the present invention. The method 100 of FIGS. 1A and 1B may be embodied in the system 300 or the system 300 may perform operations similar to those described with respect to the method 100. In FIG. 3A, a web client 302 may request creation of a portal page ("Create Page"). The Create Page request may be received by a portal server 304. A plurality of portlet objects 306 constituting a portlet page may be generated or formed. The portlet objects 306 may each register a unique key ("Register(key)") with a form multiplexer 308. The portlet objects 306 may each register the unique key in response to receiving an initialization request ("Init( )") or the like.

In FIG. 3B, the web client 302 may request markup content or similar request for the portal page ("Render Page") from the portal server 304. The portal server 304 may send a request ("doRender( )") to each of the portlet objects 306 to render their respective portlets and forms making up the portal page in response to the request for markup. A rendered portal page and portlets making up the page may be similar to the examples illustrated in FIGS. 2A and 2B which illustrate forms for the specific example illustrated.

Each of the portlet objects 306 may request a JavaScript ("getJavaScript( )") or the like from the form multiplexer 308 in response to the request for markup to render the portal page. As previously discussed the JavaScript requested may be for handling or managing subsequent form submissions when a user clicks-on or otherwise operates a "Submit" button or the like on one of the forms displayed in a portlet, similar to that described with respect to FIG. 2B.

In FIG. 3B, a user has clicked-on or otherwise operated the "Submit" button or other means. A "Submit Form" message or similar message or signal may be sent to the portal server 304. The portal server 304 may send a "processAction( )" message or similar message to the portlet object 306a that corresponds to the portlet of the form being submitted. Similar to that previously described, the JavaScript may gather inputs from all other non-selected or non-submitted forms. The gathered inputs from the forms or portlets other than the form or portlet to be submitted may be appended to the submitted form with an identifier or unique key, similar to that previously described. The inputs from other portlets or forms combined with the submitted form may be sent to the portal server 304.

The portlet server 304 may call an action handler 310 for the submitted portlet 306 in response to the HTTP request reaching the portal server 304. The action handler 310 may give control to the form multiplexer 308 or may control the form multiplexer 308 in redistributing the inputs or parameters gathered to their respective forms, similar to that previously described. Accordingly, each portlet object 306 may "getParameters( )" from the form multiplexer 308 as illustrated in FIG. 3C.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to manage inputs from multiple portlets of a portal page, comprising:
   gathering any inputs, by a computer, from forms associated with portlets other than a form associated with a portlet that is being submitted by the computer; and
   appending each gathered input to the form being submitted by the computer with an identifier of the form to which the gathered input belongs, the identifier comprising a unique key, wherein the unique key is registered with a form multiplexer by each portlet in response to each portlet being created and wherein gathering any inputs and appending each gathered input to the form being submitted is performed by computer usable program code associated with the form being submitted.

2. The method of claim 1, further comprising relating a form's name attribute to the unique key.

3. The method of claim 1, further comprising generating code for each portlet object to manage a form submission in response to a request for a web page.

4. The method of claim 1, further comprising listening for a form submission from the portal page and gathering any inputs from forms other than the form being submitted in response to the form submission.

5. The method of claim 1, further comprising interrogating a Document Object Model (DOM) to find all forms that have registered with the form multiplexer.

6. The method of claim 1, further comprising interrogating a DOM to find all forms that have registered with the form multiplexer, the interrogating being performable by code associated with a submitted form.

7. The method of claim 1, further comprising:
   separating all inputs from the submitted form; and
   redistributing the respective inputs to each associated form.

8. A system to manage inputs from multiple portlets of a portal environment, comprising:
   a portal server device, the portal server device being configured to generate at least one portal object for a portal page responsive to receiving a portal page request; and a form multiplexer associated with the portal server device, the form multiplexer generating code for managing any form submissions, the managing comprising:
  gathering any inputs from forms associated with portlets other than a form associated with a portlet that is being submitted; and
  appending each gathered input to the form being submitted with an identifier of the form to which the gathered input belongs, the identifier comprising a unique key, wherein the unique key is registered by each portlet with the form multiplexer and wherein gathering any inputs and appending each gathered input to the form being submitted is performed by computer usable program code associated with the form being submitted.

9. The system of claim 8, further comprising a listener attachable to each portlet to listen for a form submission from a portal page, wherein the code is adapted to gather any inputs from forms other than a form being submitted and to append each gathered input to the form being submitted in response to the form submission.

10. The system of claim 8, further comprising an action handler for a submitted portlet relinquishing control to the form multiplexer in response to a request.

11. A computer program product to manage inputs from multiple portlets of a portal page, the computer program product comprising:
  A non-transitory computer usable storage medium having computer usable program code embodied therein, the computer usable program code comprising:
    computer usable program code configured to gather any inputs from forms associated with portlets other than a form associated with a portlet that is being submitted; and computer usable program code configured to append each gathered input to the form being submitted with an identifier of the form to which the gathered input belongs, the identifier comprising a unique key, wherein the unique key is registered with a form multiplexer by each portlet in response to each portlet being created and wherein gathering any inputs and appending each gathered input to the form being submitted is performed by computer usable program code associated with the form being submitted.

12. The computer program product of claim 11, further comprising computer usable program code configured to listen for a form submission from the portal page and to gather any inputs from forms other than the form being submitted in response to the form submission.

13. The computer program product of claim 11, further comprising:
  computer usable program code configured to interrogate a Document Object Model (DOM) to find all forms that have registered with the form multiplexer.

14. The computer program product of claim 11, further comprising:
  computer usable program code configured to separate all inputs from the submitted form; and
  computer usable program code configured to redistribute the respective inputs to each associated form.

* * * * *